(12) United States Patent
Nishiwaki

(10) Patent No.: US 10,723,178 B2
(45) Date of Patent: Jul. 28, 2020

(54) TIRE

(71) Applicant: Sumitomo Rubber Industries, Ltd., Kobe-shi, Hyogo (JP)

(72) Inventor: Takashi Nishiwaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 223 days.

(21) Appl. No.: 15/899,787

(22) Filed: Feb. 20, 2018

(65) Prior Publication Data

US 2018/0264893 A1    Sep. 20, 2018

(30) Foreign Application Priority Data

Mar. 14, 2017    (JP) .................. 2017-048849

(51) Int. Cl.
| | | |
|---|---|---|
| *B60C 11/13* | (2006.01) | |
| *B60C 11/03* | (2006.01) | |
| *B60C 11/11* | (2006.01) | |
| *B60C 11/12* | (2006.01) | |

(52) U.S. Cl.
CPC ...... *B60C 11/1307* (2013.01); *B60C 11/0306* (2013.01); *B60C 11/11* (2013.01); *B60C 11/1204* (2013.01); *B60C 11/1236* (2013.01); *B60C 11/1353* (2013.01); *B60C 11/1369* (2013.01); *B60C 2011/1213* (2013.01); *B60C 2011/1338* (2013.01); *B60C 2011/1361* (2013.01); *B60C 2200/14* (2013.01)

(58) Field of Classification Search
CPC ................ B60C 2011/1338; B60C 2011/1361
See application file for complete search history.

(56) References Cited

U.S. PATENT DOCUMENTS

| | | | | |
|---|---|---|---|---|
| 2,056,131 A | * | 9/1936 | Brittain ............... | B60C 11/0309 |
| | | | | 152/209.21 |
| 2,706,509 A | * | 4/1955 | White ..................... | B60C 11/24 |
| | | | | 152/209.21 |
| 3,727,661 A | * | 4/1973 | Hoke .................... | B60C 11/032 |
| | | | | 152/209.22 |
| 4,114,671 A | * | 9/1978 | Maiocchi .............. | B60C 11/045 |
| | | | | 152/209.21 |

(Continued)

FOREIGN PATENT DOCUMENTS

| | | | | | |
|---|---|---|---|---|---|
| CN | 103182907 A | * | 7/2013 | ............. | B60C 11/11 |
| DE | 102010037698 A1 | * | 3/2012 | ............. | B60C 11/13 |

(Continued)

*Primary Examiner* — Xiao S Zhao
*Assistant Examiner* — John J Derusso
(74) *Attorney, Agent, or Firm* — Birch, Stewart, Kolasch & Birch LLP

(57) ABSTRACT

A tire 1 comprises a tread portion 2 comprising a plurality of blocks 5. In a development view of the tread portion 2, the blocks 5 include at least one block 5 comprising a block body 6 arranged between lateral grooves 4 adjacent to each other in a tire circumferential direction and a protruding portion 7 protruding from the block body 6 toward a main groove 3. The protruding portion 7 comprises a first part 8 having a ground contacting surface (8a) extending continuously from the block body 6 and a second part 9 arranged closer to the main groove 3 than the first part 8 and on an inner side of the ground contacting surface (8a) in a tire radial direction.

17 Claims, 7 Drawing Sheets

(56) References Cited

U.S. PATENT DOCUMENTS

| | | | | |
|---|---|---|---|---|
| 5,031,680 | A * | 7/1991 | Kajikawa | B60C 11/11 152/209.18 |
| 5,147,478 | A * | 9/1992 | Nock | B60C 11/0309 152/209.21 |
| 5,178,698 | A * | 1/1993 | Shibata | B60C 11/0318 152/209.3 |
| 5,386,861 | A * | 2/1995 | Overhoff | B60C 11/11 152/209.21 |
| 6,105,643 | A * | 8/2000 | Rohweder | B60C 11/0309 152/209.21 |
| 6,415,835 | B1 * | 7/2002 | Heinen | B60C 11/0309 152/209.21 |
| 7,182,113 | B2 * | 2/2007 | Saguchi | B60C 11/0318 152/209.2 |
| 7,195,044 | B2 * | 3/2007 | Maxwell | B60C 11/11 152/209.21 |
| D558,664 | S * | 1/2008 | Herbeuval | D12/579 |
| 7,438,101 | B2 * | 10/2008 | Shirouzu | B60C 11/13 152/209.15 |
| D591,225 | S * | 4/2009 | Ashton | D12/600 |
| D662,464 | S * | 6/2012 | Dixon | D12/579 |
| 9,517,660 | B1 * | 12/2016 | Boren | B60C 11/14 |
| 2001/0032691 | A1 * | 10/2001 | Ohsawa | B60C 11/13 152/209.18 |
| 2006/0144492 | A1 * | 7/2006 | Nguyen | B60C 11/11 152/209.23 |
| 2007/0062626 | A1 * | 3/2007 | Oyama | B60C 11/13 152/209.19 |
| 2007/0102085 | A1 * | 5/2007 | Ohashi | B60C 11/0309 152/209.18 |
| 2007/0240801 | A1 * | 10/2007 | Tanaka | B60C 11/0302 152/209.21 |
| 2008/0047644 | A1 * | 2/2008 | Yoshikawa | B60C 11/0309 152/209.27 |
| 2008/0093000 | A1 * | 4/2008 | Fujioka | B60C 11/12 152/209.21 |
| 2008/0271827 | A1 * | 11/2008 | Morrison | B60C 11/01 152/209.25 |
| 2009/0145529 | A1 * | 6/2009 | Miyazaki | B60C 11/0309 152/209.21 |
| 2009/0255614 | A1 * | 10/2009 | Ebiko | B60C 11/0302 152/209.8 |
| 2010/0000643 | A1 * | 1/2010 | Minoli | B60C 11/13 152/209.15 |
| 2010/0258228 | A1 * | 10/2010 | De Benedittis | B60C 11/13 152/209.21 |
| 2011/0226398 | A1 * | 9/2011 | Taniguchi | B60C 11/0309 152/209.21 |
| 2011/0277897 | A1 * | 11/2011 | Yokomakura | B60C 11/0309 152/209.18 |
| 2012/0318420 | A1 * | 12/2012 | Sawai | B60C 11/042 152/209.15 |
| 2013/0068359 | A1 * | 3/2013 | Suita | B60C 11/01 152/209.16 |
| 2013/0153105 | A1 * | 6/2013 | Bournat | B60C 11/0309 152/209.21 |
| 2013/0220498 | A1 * | 8/2013 | Kawakami | B60C 11/01 152/209.1 |
| 2013/0312889 | A1 * | 11/2013 | Hanami | B60C 11/11 152/209.18 |
| 2014/0130951 | A1 * | 5/2014 | Kawakami | B60C 11/1307 152/209.21 |
| 2015/0158340 | A1 * | 6/2015 | Kaji | B60C 11/1307 152/209.21 |
| 2015/0202927 | A1 * | 7/2015 | Korkama | B60C 11/1307 152/209.18 |
| 2015/0290980 | A1 * | 10/2015 | Qu | B60C 11/1376 152/209.18 |
| 2015/0336430 | A1 * | 11/2015 | Sueyoshi | B60C 11/0316 152/209.24 |
| 2016/0068025 | A1 * | 3/2016 | Kodama | B60C 11/0311 152/209.12 |
| 2016/0121659 | A1 * | 5/2016 | Kageyama | B60C 11/11 152/209.24 |
| 2016/0137003 | A1 * | 5/2016 | Fujioka | B60C 11/032 152/209.18 |
| 2016/0193882 | A1 * | 7/2016 | Mancinelli | B60C 11/0316 152/209.12 |
| 2016/0280013 | A1 * | 9/2016 | Jacobs | B60C 11/1323 |
| 2017/0015142 | A1 * | 1/2017 | Kaneko | B60C 11/00 |
| 2017/0015144 | A1 * | 1/2017 | Ogihara | B60C 11/1307 |
| 2017/0120691 | A1 * | 5/2017 | Arai | B60C 11/0304 |
| 2017/0136830 | A1 * | 5/2017 | Kuwano | B60C 11/11 |
| 2017/0157990 | A1 * | 6/2017 | Bortolet | B60C 11/0302 |
| 2017/0326919 | A1 * | 11/2017 | Heinhaupt | B60C 11/1307 |
| 2017/0341473 | A1 * | 11/2017 | Roty | B60C 11/1353 |
| 2018/0001709 | A1 * | 1/2018 | Fujioka | B60C 11/047 |
| 2019/0001754 | A1 * | 1/2019 | Roty | B60C 11/042 |
| 2019/0225030 | A1 * | 7/2019 | Pizzorno | B60C 11/0306 |

FOREIGN PATENT DOCUMENTS

| | | | | |
|---|---|---|---|---|
| EP | 0544236 | B1 * | 2/1996 | B60C 11/0309 |
| EP | 3219514 | A1 * | 9/2017 | B60C 11/1315 |
| JP | 04201606 | A * | 7/1992 | B60C 11/042 |
| JP | 04334606 | A * | 11/1992 | B60C 11/042 |
| JP | 08318708 | A * | 12/1996 | |
| JP | 09300915 | A * | 11/1997 | |
| JP | 11151912 | A * | 6/1999 | |
| JP | 2002219909 | A * | 8/2002 | |
| JP | 2003063213 | A * | 3/2003 | B60C 11/13 |
| JP | 2003154812 | A * | 5/2003 | |
| JP | 2005041303 | A * | 2/2005 | |
| JP | 2006111088 | A * | 4/2006 | B60C 11/045 |
| JP | 2007030547 | A * | 2/2007 | |
| JP | 4318239 | B2 * | 8/2009 | B60C 11/0309 |
| JP | 2009292343 | A * | 12/2009 | |
| JP | 2016-113066 | A | 6/2016 | |
| JP | 2017109636 | A * | 6/2017 | |
| WO | WO-2016113014 | A1 * | 7/2016 | B60C 11/1307 |
| WO | WO-2016113017 | A1 * | 7/2016 | B60C 11/11 |
| WO | WO-2017110663 | A1 * | 6/2017 | B60C 11/047 |
| WO | WO-2018153571 | A1 * | 8/2018 | B60C 11/1307 |

* cited by examiner

TIRE

TECHNICAL FIELD

The present invention relates to a tire provided in a tread portion thereof with a plurality of blocks.

BACKGROUND ART

A tire having a tread portion provided with a plurality of blocks divided by main grooves and lateral grooves is proposed, for example, in Japanese unexamined Patent Application Publication No. 2016-113066. In a tire having such a block pattern, it is known to increase groove volume in order to improve mud performance which is running performance on a soft road surface and the running performance on a wet road surface (hereinafter simply referred to as "wet performance"), for example.

However, if the groove volume is increased as described above, pattern rigidity of the tread portion is decreased, therefore, it is possible that steering stability on a dry road surface is deteriorated.

SUMMARY OF THE INVENTION

The present invention was made in view of the above, and a primary object thereof is to provide a tire capable of exerting excellent mud performance, wet performance, and steering stability on a dry road surface.

In one aspect of the present invention, a tire comprises a tread portion comprising a plurality of blocks divided by a main groove extending in a tire circumferential direction, a plurality of lateral grooves extending in a tire axial direction from the main groove, wherein in a development view of the tread portion, the blocks include at least one block comprising a block body arranged between the lateral grooves adjacent to each other in the tire circumferential direction, and a protruding portion protruding from the block body toward the main groove, and the protruding portion comprises a first part having a ground contacting surface extending continuously from the block body and a second part arranged closer to the main groove than the first part and on an inner side of the ground contacting surface in a tire radial direction.

In another aspect of the invention, it is preferred that the protruding portion is disposed on one side in the tire circumferential direction of the block body.

In another aspect of the invention, it is preferred that the protruding portion includes a corner portion of the block body on one side in the tire circumferential direction.

In another aspect of the invention, it is preferred that in the development view of the tread portion, a length of the protruding portion along a longitudinal direction of the main groove decreases toward a protruding tip of the protruding portion.

In another aspect of the invention, it is preferred that, in the development view of the tread portion, the protruding portion has a trapezoidal shape in which the length gradually decreases toward the protruding tip.

In another aspect of the invention, it is preferred that a maximum length (B) of the first part along the longitudinal direction of the main groove is in a range of from 45% to 55% of a maximum length (A) of the block body along the longitudinal direction of the main groove.

In another aspect of the invention, it is preferred that a sum (B+C) of the maximum length (B) of the first portion along the longitudinal direction of the main groove and a minimum length (C) of the first portion along the longitudinal direction of the main groove is in a range of from 95% to 105% of the maximum length (A) of the block body along the longitudinal direction of the main groove.

In another aspect of the invention, it is preferred that a minimum length (D) of the second part along the longitudinal direction of the main groove is in a range of from 25% to 35% of the maximum length (B) of the first portion along the longitudinal direction of the main groove.

In another aspect of the invention, it is preferred that a protruding length of the protruding portion in a protruding direction thereof is in a range of from 15% to 25% of a minimum length of the block main body in the tire axial direction.

In another aspect of the invention, it is preferred that a radial height of the second portion is in a range of from 45% to 55% of a radial height of the first portion when each measured from a groove bottom of the main groove.

In another aspect of the invention, it is preferred that the plurality of the blocks is shoulder blocks arranged axially outermost in the tread portion.

DESCRIPTION OF THE PREFERRED EMBODIMENT

An embodiment of the present invention will now be described in conjunction with accompanying drawings.

Figure 1:
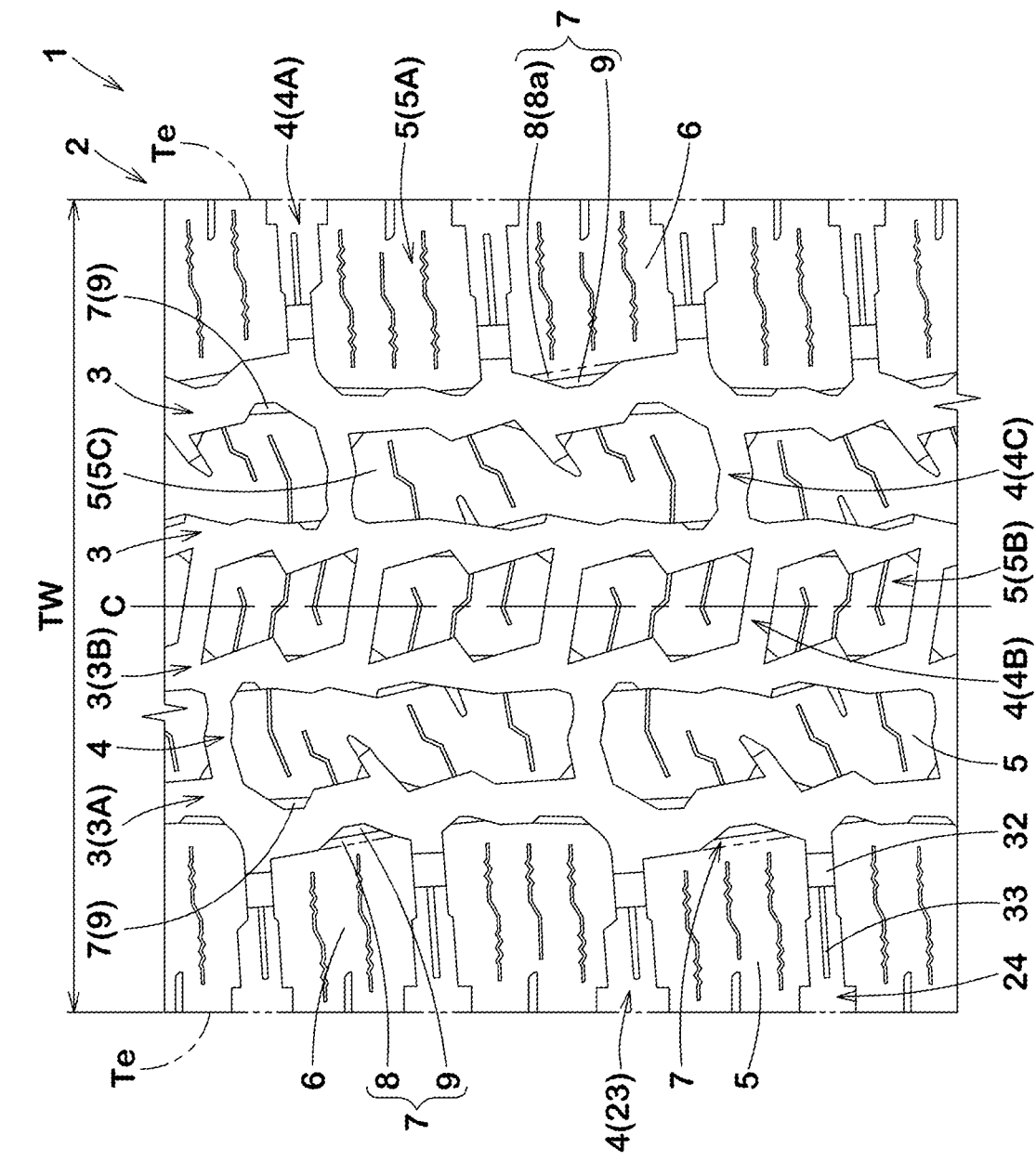
FIG. 1 is a development view of a tread portion of a tire according to one embodiment of the present invention.

FIG. 1 is a development view of a tread portion 2 of a tire 1 according to an embodiment of the present invention. As a preferred embodiment, the tire 1 in this embodiment is shown as a pneumatic tire for a passenger car. However, it is needless to say that the present invention can also be applied to a tire of other categories such as a tire for heavy duty, for example.

As shown in FIG. 1, the tread portion 2 in this embodiment is provided with main grooves 3 extending in a tire circumferential direction and a plurality of lateral grooves 4 extending from the main grooves in a tire axial direction.

The main grooves 3 in this embodiment extend continuously in the tire circumferential direction. The main grooves 3 in this embodiment include a pair of shoulder main grooves 3A each provided closest to respective one of tread edges (Te), and a pair of crown main grooves 3B each provided between one of the shoulder main grooves 3A and a tire equator (C). Note that the main grooves 3 are not limited to such configuration, and can be configured in various forms.

The "tread edges Te" are defined as axially outermost ground contacting positions in a standard load state in which the tire 1 in a standard state is in contact with a flat surface with zero camber angle by being loaded with a standard tire load. The standard state is a state in which the tire 1 is mounted on a standard rim, inflated to a standard pressure, and loaded with no tire load. The tread width TW is defined as a distance in the tire axial direction between the tread edges Te of the tire 1 in the standard state. Unless otherwise noted, dimensions and the like of various parts of the tire are values measured in the standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The lateral grooves 4 in this embodiment include shoulder lateral grooves 4A, crown lateral grooves 4B, and middle lateral grooves 4C. Each of the shoulder lateral grooves 4A connects between one of the shoulder main grooves 3A and its adjacent one of the tread edges (Te). Each of the crown lateral grooves 4B connects between the pair of the crown main grooves 3B. Each of the middle lateral grooves 4C connects between one of the shoulder main grooves 3A and its adjacent one of the crown main grooves 3B. Note that the lateral grooves 4 can be embodied in various forms without being limited to such configurations.

The tread portion 2 in this embodiment is provided with a plurality of blocks 5 divided by the main grooves 3 and the lateral grooves 4. The tire 1 configured as such can exert basic mud performance and wet performance.

Figure 2:
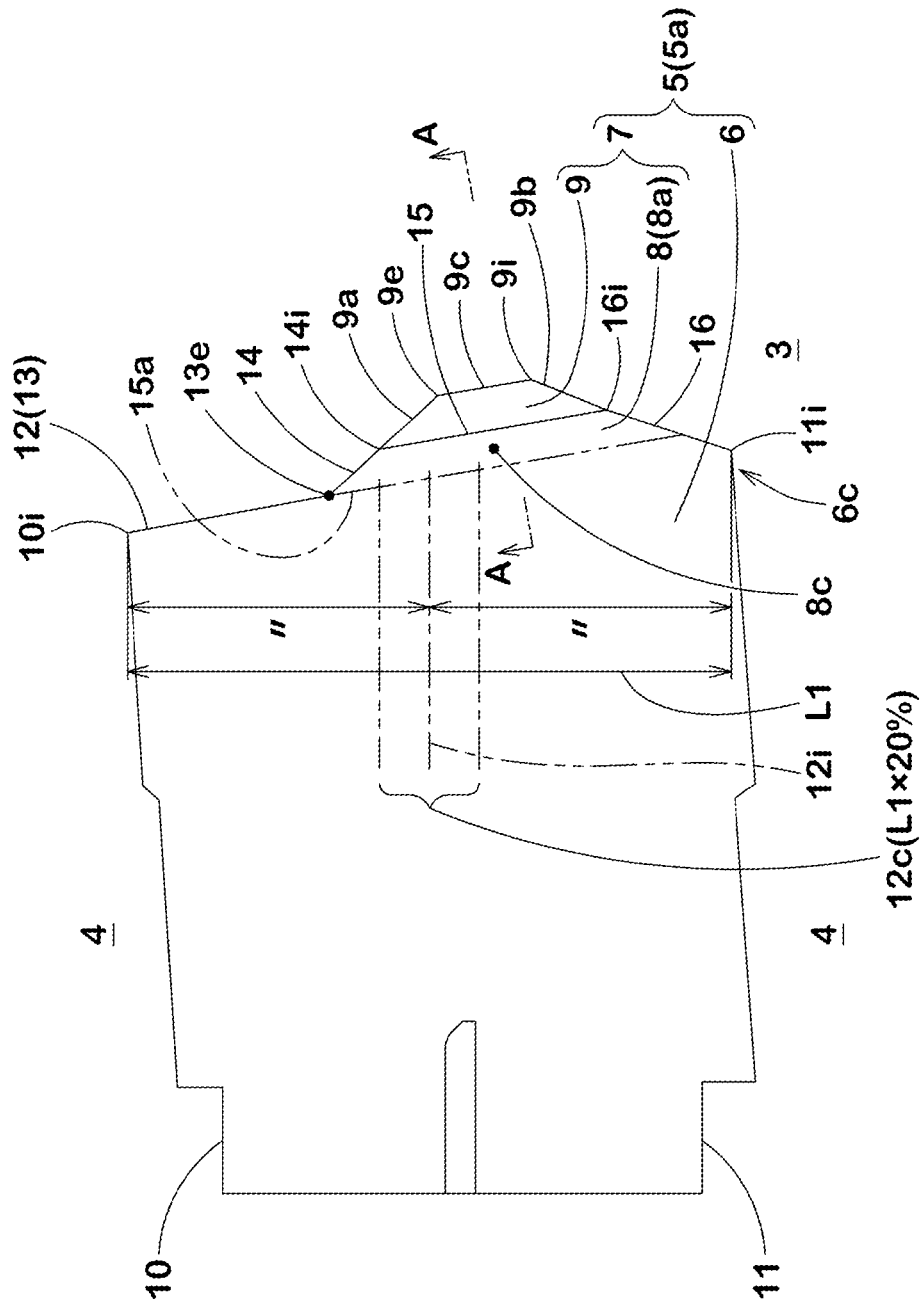
FIG. 2 is a top view of a block according to one embodiment of the present invention.

FIG. 2 is a top view showing an example of the block 5 in this embodiment. As shown in FIG. 2, the block 5 includes a block body 6 between a pair of the lateral grooves 4 adjacent in the tire circumferential direction and a protruding portion 7 protruding from the block body 6 toward one of the main grooves 3. The protruding portion 7 configured as such has an edge component in the tire axial direction, thus shearing force against mud is increased, therefore, it is possible that the mud performance is further improved.

The protruding portion 7 includes a first part 8 and a second part 9. The first part 8 has a ground contacting surface (8a) extending continuously from the block body 6. The second part 9 is positioned closer to the main grooves 3 than the first part 8 and is positioned inside the ground contacting surface (8a) in a tire radial direction. The first part 8 configured as such increases a ground contacting area and rigidity of the block 5, therefore, the steering stability on a dry road surface is improved. Further, the second part 9 is positioned radially inside the first part 8, thus decrease of groove volume is suppressed, therefore, it is possible that the deterioration of the wet performance is prevented. Furthermore, the second part 9 deforms, for example, during cornering, thus soil discharging performance of the main groove 3 is improved, therefore, the mud performance is improved. Thereby, the tire 1 in this embodiment has excellent mud performance, wet performance and steering stability on a dry road surface.

The protruding portion 7 in this specification is defined as follows. The block 5 has a ground contacting surface (5a) including a pair of lateral block edges 10 and 11 extending along the lateral grooves 4 and a longitudinal block edge 12 extending between the pair of the lateral block edges 10 and 11 along the main grooves 3. The longitudinal block edge 12 includes a first edge portion 13, a second edge portion 14, a third edge portion 15, and a fourth edge portion 16. The first edge portion 13 extends straight from an inner end (10i) in the tire axial direction of one of the lateral block edges (upper lateral block edge 10 in FIG. 2) to an inner end (11i) in the tire axial direction of the other one of the lateral block edges (lower lateral block edge 11 in FIG. 2). The second edge portion 14 extends continuously from the first edge portion 13, axially outwardly, and obliquely toward the inner end (11i) at a larger angle with respect to the tire circumferential direction than the first edge portion 13. The third edge portion 15 extends continuously from the second edge portion 14, axially outwardly, and obliquely toward the inner end (11i) at a smaller angle with respect to the tire circumferential direction than the second edge portion 14. The fourth edge portion 16 extends continuously from the third edge portion 15 and obliquely in an opposite direction to the second edge portion 14 at a larger angle with respect to the tire circumferential direction than the third edge portion 15. The protruding portion 7 is defined as a portion protruding toward the main groove 3 from an imaginary line (15a). The imaginary line (15a) is obtained by extending the first edge portion 13 smoothly in parallel with the third edge portion 15 from a connecting position (13e) of the first edge portion 13 and the second edge portion 14.

The lateral block edges 10 and 11 are defined as edges of the ground contacting surface whose edge portions positioned closest to the main groove 3 is inclined at an angle not greater than 30 degrees with respect to the tire axial direction.

The first edge portion 13 in this embodiment is connected with the inner end (10i) of one of the lateral block edges, that is, the lateral block edge 10. The fourth edge portion 16 in this embodiment is connected with the inner end (11i) of the other one of the lateral block edges, that is, the lateral block edge 11. The imaginary line (15a) in this embodiment is connected with the fourth edge portion 16 at a position other than the inner end (11i).

Figure 3:
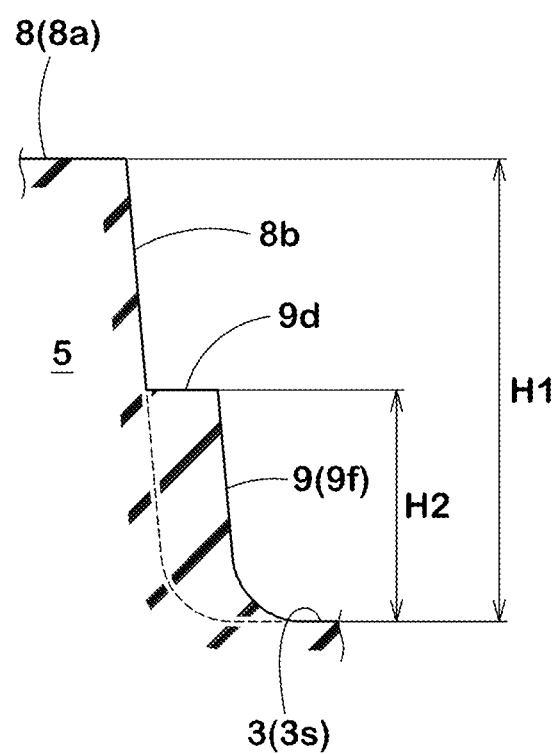
FIG. 3 is a cross-sectional view taken along A-A line of FIG. 2.

FIG. 3 is a cross-sectional view taken along A-A line of FIG. 2. As shown in FIG. 3, the first part 8 includes the ground contacting surface (8a) and a first wall surface (8b) extending from the ground contacting surface (8a) to a groove bottom (3s). The second part 9 includes an outwardly facing surface (9d) facing radially outward and protruding toward the main groove 3 from the first wall surface (8b) positioned between the ground contacting surface (8a) and the groove bottom (3s), and a second wall surface (9f) connecting between the outwardly facing surface (9d) and the groove bottom (3s). The outwardly facing surface (9d) in this embodiment extends in parallel with the ground contacting surface (8a). Thereby, deformation during cornering is made easy and soil discharging performance is further improved.

As shown in FIG. 2, the protruding portion 7 is provided on one side in the tire circumferential direction of the block body 6. Thereby, rigidity of the block 5 is maintained high, therefore, the steering stability on a dry road surface is improved. The protruding portion being provided on one side in the tire circumferential direction means that a centroid (8c) of the ground contacting surface (8a) of the first part 8 is shifted to either side in the tire circumferential direction from a center portion (12c) of the longitudinal block edge 12. The center portion (12c) of the longitudinal block edge 12 is a region in a range of 10% of a length L1 in the tire circumferential direction of the longitudinal block edge 12 from a center position (12i) in the tire circumferential direction of the longitudinal block edge 12 on both sides in the tire circumferential direction. In other words, the center portion (12c) is the region having a length of 20% of the length L1 with the center position (12i) at the center thereof in the tire circumferential direction.

The protruding portion 7 is formed so as to include a corner portion (6c) positioned on one side in the tire circumferential direction of the block body 6. Thereby, the steering stability on a dry road surface is further improved. The protruding portion 7 including the corner portion (6c) means that the protruding portion 7 is connected with either one of the inner ends (10i) and (11i) of the lateral block edges 10 and 11, respectively, or that the fourth edge portion 16 is connected with either one of the inner ends (10i) and (11i).

The first part 8 in this embodiment is an area surrounded by the imaginary line (15a), the second edge portion 14, the third edge portion 15, and the fourth edge portion 16 in the development view of the tread portion 2. The second part 9 in this embodiment is an area surrounded by the third edge portion 15, a first axial direction edge (9a), a second axial direction edge (9b), and a circumferential direction edge (9c). The first axial direction edge (9a) extends axially inwardly from an axially inner end (14i) of the second edge portion 14, for example. The second axial direction edge (9b) extends axially inwardly from an axially inner end (16i) of the fourth edge portion 16, for example. The circumferential direction edge (9c) extends so as to connect between an inner end (9e) of the first axial direction edge (9a) and an inner end (9i) of the second axial direction edge (9b), for example.

The first axial direction edge (9a) and the second edge portion 14 in this embodiment together form one straight line. The second axial direction edge (9b) and the fourth edge portion 16 in this embodiment together form one straight line. Thereby, rigidity of the protruding portion 7 is increased, therefore, the steering stability on a dry road surface is improved.

Figure 4:
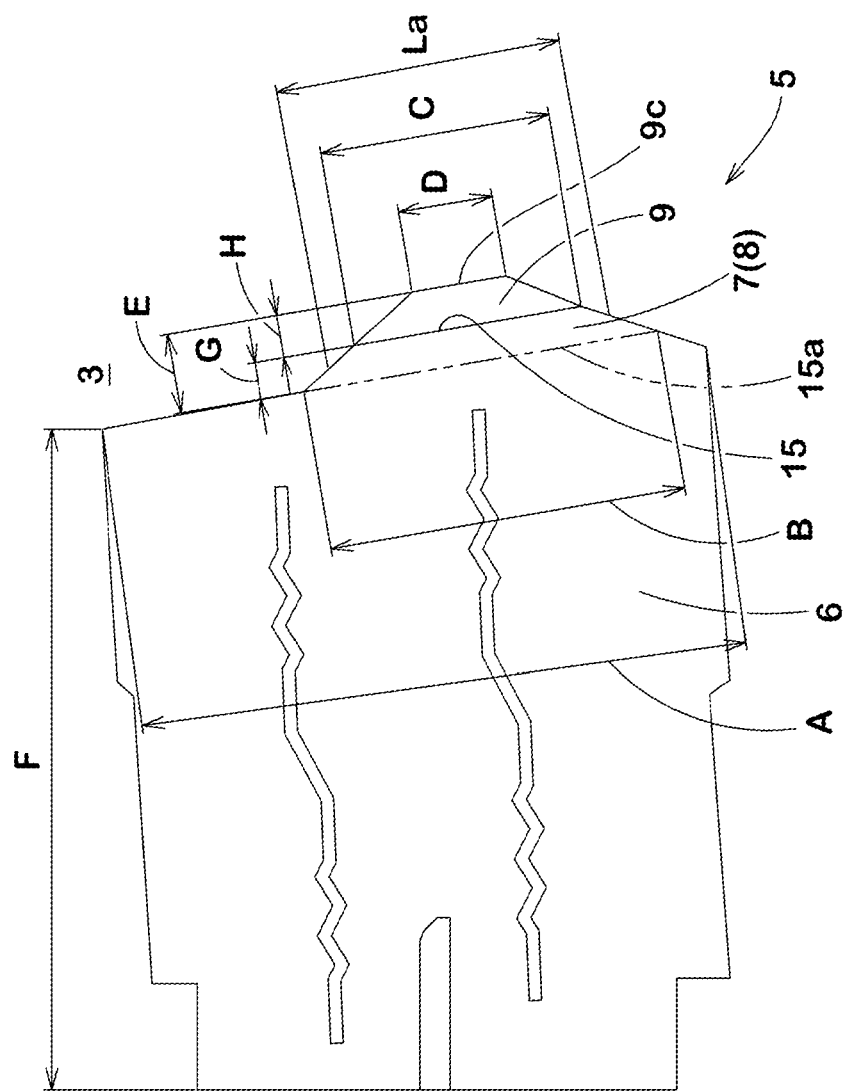
FIG. 4 is a top view of a block according to one embodiment of the present invention.

FIG. 4 is a top view of the block 5 according to an embodiment of the present invention. As shown in FIG. 4, a length (La) of the protruding portion 7 in this embodiment along a longitudinal direction of the main grooves 3 decreases toward a protruding tip of the protruding portion 7. The protruding portion 7 configured as such can suppress decrease of groove volume of the main grooves 3, therefore, it is possible that deterioration of the wet performance is prevented. Further, rigidity difference at the connecting portion between the block body 6 and the protruding portion 7 becomes small, therefore, the steering stability on a dry road surface is improved. The length along the longitudinal direction of the main groove 3 means a length parallel to third edge portion 15.

The protruding portion 7 in this embodiment is configured to have a trapezoidal shape in which the length (La) gradually decreases toward the protruding tip. The protruding portion 7 configured as such effectively exert the above described effects. The protruding portion 7 having the trapezoidal shape, in this specification, in the development view of the tread portion 2, means that the imaginary line (15a) and the circumferential direction edge (9c) extend in parallel with each other, and that an angle between the imaginary line (15a) and the circumferential direction edge (9c) is not greater than 5 degrees.

It is preferred that a maximum length (B) of the first part 8 along the longitudinal direction of the main groove 3 adjacent thereto is in a range of from 45% to 55% (50%±5%) of a maximum length (A) of the block body 6 along the longitudinal direction of the main grooves 3 adjacent thereto. If the maximum length (B) of the first part 8 is larger than 55% of the maximum length (A) of the block body 6, groove volume of the main groove 3 becomes small, therefore, it is possible that the mud performance and the wet performance are deteriorated. If the maximum length (B) is smaller than 45% of the maximum length (A), the effect of increasing the rigidity of the block 5 becomes small, therefore, it is possible that the steering stability is deteriorated.

It is preferred that a sum (B+C) of the maximum length (B) of the first part 8 and a minimum length (C) of the first part 8 along the longitudinal direction of the main groove 3 adjacent thereto is in a range of 95% to 105% (100%±5%) of the maximum length (A) of the block body 6. If the sum (B+C) is larger than 105% of the maximum length (A) of the block body 6, the groove volume of the main groove 3 adjacent thereto becomes small, therefore, it is possible that the mud performance and the wet performance is deteriorated. If the sum (B+C) is smaller than 95% of the maximum length (A), the effect of increasing the rigidity of the block 5 becomes small, therefore, it is possible that the steering stability is deteriorated.

It is preferred that a sum (C+D) of the minimum length (C) of the first part 8 along the longitudinal direction of the main groove 3 adjacent thereto and a minimum length (D) of the second part 9 along the longitudinal direction of the main groove 3 adjacent thereto is in a range of from 95% to 105% (100%±5%) of the maximum length (B) of the first part 8. If the sum (c+D) is larger than 105% of the maximum length (B) of the first part 8, rigidity of the second part 9 becomes large, therefore, for example, deformation of the second part 9 during cornering is suppressed, thereby, it is possible that the mud performance is deteriorated. Further, the groove volume of the main groove becomes small, therefore, it is possible that the wet performance is deteriorated. If the sum (c+D) is smaller than 95% of the maximum length (B) of the first part 8, rigidity of the first part 8 becomes small, therefore, it is possible that the steering stability on a dry road surface is deteriorated. Further, rubber volume of the second part 9 becomes small, therefore, the deformation of the second part 9 during cornering becomes small, thereby, it is possible that the mud performance is deteriorated.

It is preferred that a protruding length (E) of the protruding portion 7 in a protruding direction thereof is in a range of from 15% to 25% (20%±5%) of a minimum length (F) of the block body 6 in the tire axial direction. If the protruding length (E) of the protruding portion 7 is smaller than 15% of the minimum length (F) of the block body 6, edge component of the protruding portion 7 in the tire axial direction becomes small, therefore, shearing force against mud becomes small, thereby, it is possible that the mud performance is deteriorated. If the protruding length (E) of the protruding portion 7 is larger than 25% of the minimum length (F) of the block body 6, the groove volume of the main grooves 3 becomes small, therefore, it is possible that the mud performance and the wet performance is deteriorated. In the present specification, the projecting length (E)

is a minimum length between the imaginary line (15a) and the circumferential direction edge (9c) in the development view of the tread portion 2.

It is preferred that the minimum length (D) of the second part 9 is in a range of from 25% to 35% (30%±5%) of the maximum length (B) of the first part 8. If the minimum length (D) of the second part 9 is larger than 35% of the maximum length (B) of the first part 8, rigidity of the second part 9 becomes excessively large, thus, deformation of the second part 9 during cornering becomes small, for example, therefore, soil discharging performance is deteriorated, thereby, it is possible that the mud performance is deteriorated. If the minimum length (D) of the second part 9 is smaller than 25% of the maximum length (B) of the first part 8, the rigidity of the block 5 becomes small, therefore, it is possible that the steering stability on a dry road surface is deteriorated.

It is preferred that a protruding length (G) of the first part 8 in a protruding direction thereof is smaller than a protruding length (H) of the second part 9 in a protruding direction thereof. Thereby, effect of the decrease in the groove volume by the second part 9 and the deformation during cornering, for example, are promoted, while the rigidity of the block 5 is effectively increased by the protruding portion 7, therefore, the mud performance, the wet performance, and the steering stability on a dry road surface are improved in a good balance. In order to effectively exert the above-described effects, it is preferred that the protruding length (G) of the first part 8 is in a range of from 70% to 90% of the protrusion length (H) of the second part 9.

As shown in FIG. 3, it is preferred that a height H2 of the second part 9 in the tire radial direction measured from the groove bottom (3s) of the main groove 3 is in a range of from 45% to 55% (50%±5%) of a height H1 of the first part 8 in the tire radial direction. If the height H2 of the second part 9 is larger than 55% of the height H1 of the first part 8, the groove volume of the main groove 3 becomes small, therefore, it is possible that the wet performance is deteriorated. If the height H2 of the second part 9 is smaller than 45% of the height H1 of the first part 8, the rigidity of the block 5 becomes small, therefore, it is possible that the steering stability on a dry road surface is deteriorated.

As shown in FIG. 1, the blocks 5 in this embodiment include shoulder blocks 5A, crown blocks 5B, and middle blocks 5c. Each of the shoulder blocks 5A is defined by one of the shoulder main grooves 3A, a pair of the shoulder lateral grooves 4A adjacent to each other in the tire circumferential direction, and one of the tread edges (Te). Each of the crown blocks 5B is defined by the pair of the crown main grooves 3B and a pair of the crown lateral grooves 4B adjacent to each other in the tire circumferential direction. Each of the middle blocks 5c is defined by one of the shoulder main grooves 3A, one of the crown main grooves 3B adjacent thereto, and a pair of the middle lateral grooves 4c adjacent to each other in the tire circumferential direction.

The protruding portions 7 in this embodiment are provided in the shoulder blocks 5A. The shoulder blocks 5A is the blocks 5 to which largest lateral force is applied during cornering of the tire 1. By providing the protruding portions 7 configured as such in the shoulder blocks 5A, it is possible that the mud performance, the wet performance, and the steering stability on a dry road surface are improved more effectively. It should be noted that it is needless to say that the protruding portions 7 may be provided not only in the shoulder blocks 5A, but also in the crown blocks 5B or the middle blocks 5c, for example. In this embodiment, the middle blocks 5c are also provided with the protruding portions 7 of the present invention.

Figure 5:
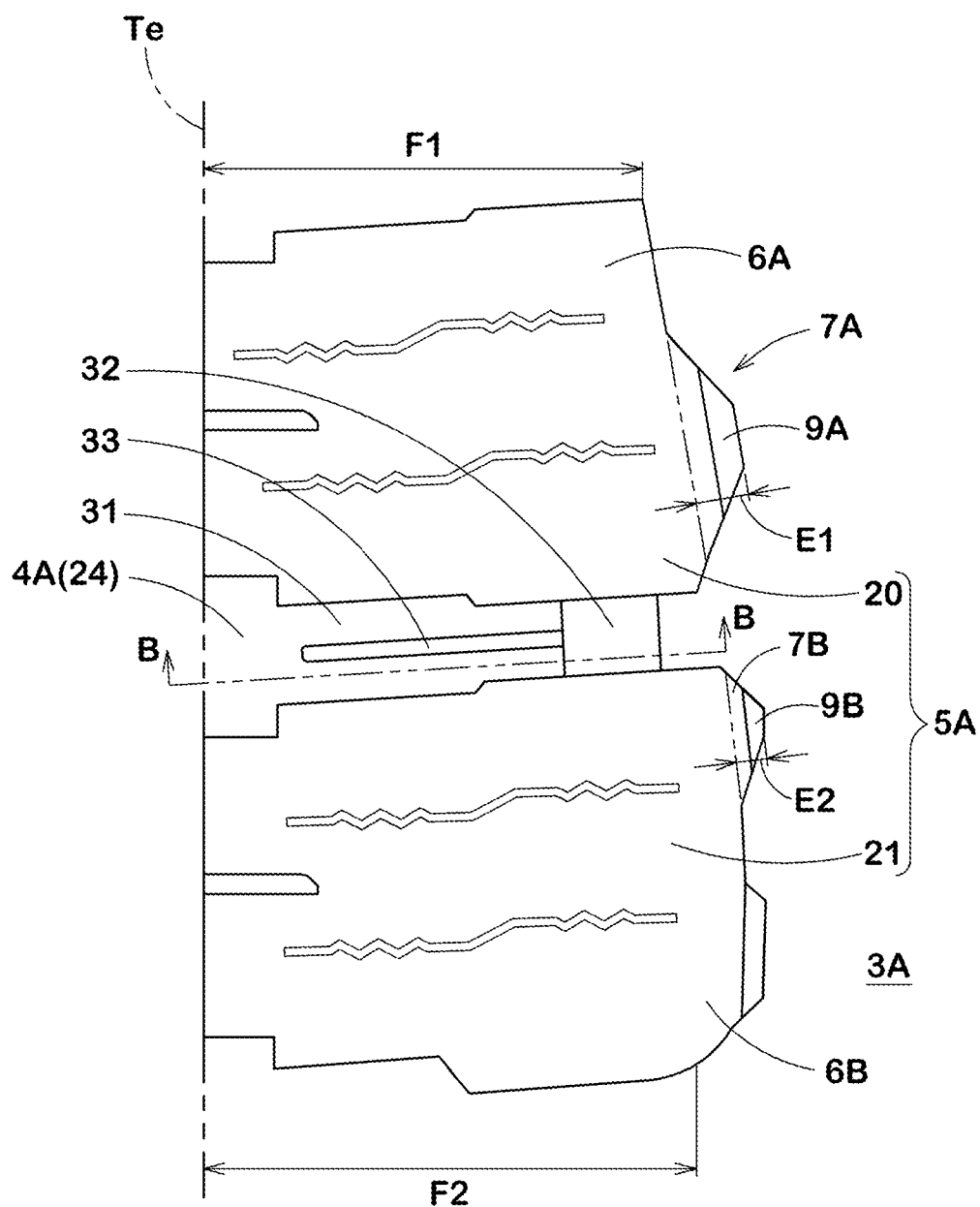
FIG. 5 is a top view of blocks according to one embodiment of the present invention.

FIG. 5 is a top view of the shoulder blocks 5A. As shown in FIG. 5, the shoulder blocks 5A include first shoulder blocks 20 and second shoulder blocks 21. The first shoulder blocks 20 and the second shoulder blocks 21 are arranged alternately in the tire circumferential direction. Each of the first shoulder blocks 20 in this embodiment is configured so that a minimum length F1 of a block body 6A thereof defined in the same way as the above described minimum length (F) is smaller than a minimum length F2 of a block body 6B thereof defined in the same way as the above described minimum length (F) of each of the second shoulder blocks 21.

Each of the first shoulder blocks 20 in this embodiment has the block body 6A and a protruding portion 7A. Each of the second shoulder blocks 21 in this embodiment also has the block body 6B and a protruding portion 7B. Hereinafter, the protruding portions 7A of the first shoulder blocks 20 may be referred to as first protruding portions 7A, and the protruding portions 7B of the second shoulder blocks 21 may be referred to as second protruding portions 7B.

It is preferred that a ratio (E1/F1) of a protruding length E1 of the first protruding portion 7A and the minimum length F1 of the block body 6A is larger than a ratio (E2/F2) of a protruding length E2 of the second protruding portion 7B and the minimum length F2 of the block body 6B. Thereby, groove volumes of the shoulder main grooves 3A and a ground contacting area of each of the first shoulder blocks 20 and the second shoulder blocks 21 are secured in a good balance, therefore, the mud performance, the wet performance, and the steering stability on a dry road surface are improved.

The first protruding portion 7A is formed on one side (lower side in FIG. 5) in the tire circumferential direction of the block body 6A. Further, the second protruding portions 7B is formed on the other side (upper side in FIG. 5) in the tire circumferential direction of the block body 6B. Thereby, for example, deformation of a second part 9A of the first protruding portion 7A and a second part 9B of the second protruding portion 7B during cornering improves the soil discharging performance of the shoulder lateral grooves 4A positioned between the first protruding portion 7A and the second protruding portion 7B, therefore, the mud performance is further improved.

The shoulder lateral grooves 4A in this embodiment include first shoulder lateral grooves 23 (shown in FIG. 1) and second shoulder lateral grooves 24 having larger lengths in the tire axial direction than the first shoulder lateral grooves 23. In this embodiment, the second shoulder lateral groove 24, in which mud is more difficult to be discharged than the first shoulder lateral groove 23, is disposed between the first protruding portion 7A and the second protruding portion 7B. Thereby, the above-described effects are effectively exerted.

Figure 6:
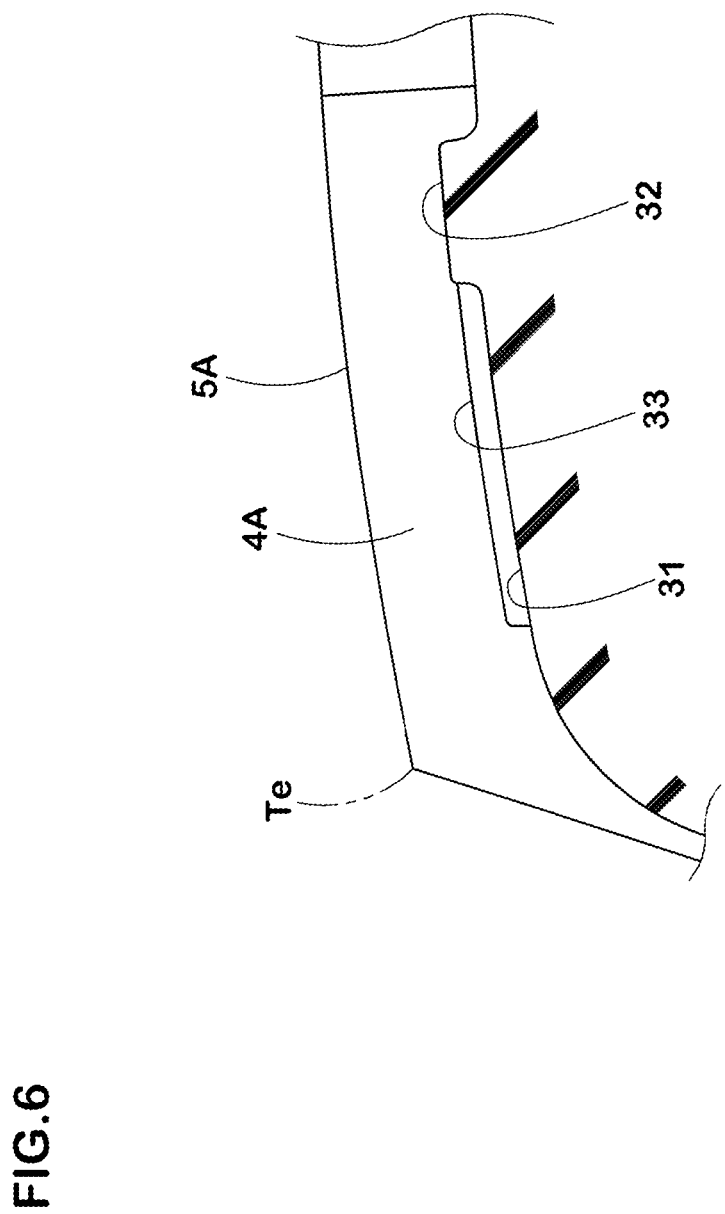
FIG. 6 is a cross-sectional view taken along B-B line of FIG. 5.

FIG. 6 is a cross-sectional view taken along B-B line of FIG. 5. As shown in FIG. 6, the shoulder lateral groove 4A is provided with a tie bar 32 formed by raising a groove bottom 31, and a ridge 33 formed by raising the groove bottom 31 and extending axially outwardly from the tie bar 32. The tie bar 32 in this embodiment is a protruding body extending so as to connect between the shoulder blocks 5A adjacent to each other in the tire circumferential direction.

The ridge 33 in this embodiment is a protruding body having a width smaller than that of the tie bar 32 and a larger length in the tire axial direction than that of the tie bar 32. The tie bar 32 configured as such suppresses deformation of the block body 6 in the tire circumferential direction, therefore, the steering stability on a dry road surface is improved.

test results are indicated by an evaluation point based on Reference 1 being 100, wherein a larger numerical value is better.

Tire rim: 17×8.03
Tire pressure: 240 kPa (all wheels)
The test results and the like are shown in Table 1.

TABLE 1

Figure 7:
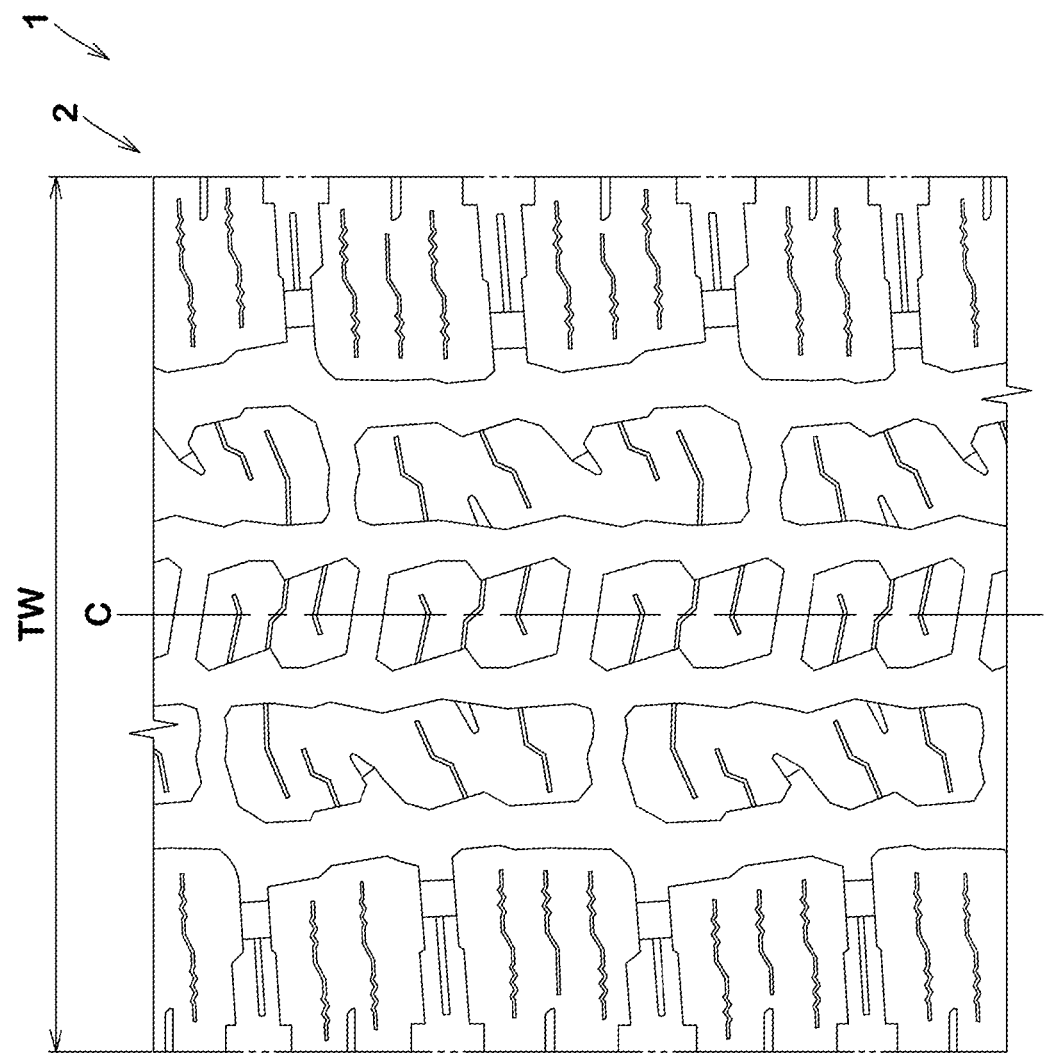
FIG. 7 is a development view of a tread portion of reference.

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Figure showing shape of Tread pattern | FIG. 7 | FIG. 1 | FIG. 1 | FIG. 1 | FIG. 1 | FIG. 1 | FIG. 1 | FIG. 1 | FIG. 1 | FIG. 1 | FIG. 1 |
| Position of Centroid of First part | — | shifted | center portion | shifted | shifted | shifted | shifted | shifted | shifted | shifted | shifted |
| Minimum length (D)/ Maximum length (B) [%] | — | 30 | 30 | 20 | 25 | 35 | 40 | 30 | 30 | 30 | 30 |
| Protruding length (G)/Protruding length (H) [%] | — | 80 | 80 | 80 | 80 | 80 | 80 | 65 | 70 | 90 | 95 |
| Mud performance [evaluation point: larger is better] | 100 | 110 | 105 | 107 | 110 | 110 | 108 | 107 | 110 | 110 | 108 |
| wet performance [evaluation point: larger is better] | 100 | 100 | 100 | 102 | 100 | 100 | 98 | 102 | 100 | 100 | 98 |
| Steering stability on Dry road surface [evaluation point: larger is better] | 100 | 110 | 107 | 105 | 110 | 110 | 112 | 105 | 110 | 110 | 112 |

Further, the ridge 33 increases shearing force of the shoulder lateral groove 4A against mud, therefore, the mud performance is improved.

While detailed description has been made of the tire as an embodiment of the present invention, it is needless to say that the present invention can be embodied in various forms without being limited to the illustrated specific embodiment.

WORKING EXAMPLE (EXAMPLE)

Tires of size 265/70R17 having the basic tread pattern shown in FIG. 1 were made by way of test according to the specifications listed in Table 1. Then each of the test tires was tested for the mud performance, the wet performance, and the steering stability on a dry road surface. Major common specifications of the test tires and the test methods are as follows.
<First Shoulder Block>
The maximum length (B)/the maximum length (A): 50%
A ratio H2/H1 of the height H2 of the second part 9/the height H1 of the first part 8: 47%
A ratio E/F of the protruding length (E) and the minimum length (F): 20%
Note that "shifted" in Table 1 means that the centroid of the first part is shifted from the center portion to either side in the tire circumferential direction. Further, the numerical values shown in Table 1 are those of the first protruding portions.
<Mud Performance, Wet Performance, Steering Stability on Dry Road Surface>
Each of the test tires was mounted on all wheels of a 4WD-car with a displacement of 3600 cc under the following conditions. Then a test driver drove the test car on a soft road surface covered with mud, a wet road surface with a puddle having depth of 2 mm, and a dry asphalt road surface of a test course, and running characteristics related to traction, the steering stability, and steering performance are evaluated by the driver's feeling during the test drive. The From the test results, it was confirmed that the mud performance, the wet performance, and the steering stability on the dry road surface were improved for each of the tires as the examples compared with the tire as the comparative example. Further, tires having different ratio of the maximum length (B)/maximum length (A), different ratio of the height H2/H1 in the tire radial direction, and different ratio E/F of the protruding lengths within a preferable range for each were tested, the similar results to those of Table 1 were obtained.

The invention claimed is:
1. A tire comprising:
a tread portion comprising a plurality of blocks divided by a main groove extending in a tire circumferential direction, and a plurality of lateral grooves extending in a tire axial direction from the main groove, wherein
the plurality of the blocks is shoulder blocks arranged axially outermost in the tread portion,
in a development view of the tread portion, the blocks include a first block and a second block each comprising a block body arranged between the lateral grooves adjacent to each other in the tire circumferential direction, and a protruding portion protruding from the block body toward the main groove,
the protruding portion comprises a first part having a ground contacting surface extending continuously from the block body and a second part arranged closer to the main groove than the first part and on an inner side of the ground contacting surface in a tire radial direction,
a minimum length F1 in the tire axial direction of the block body of the first block is smaller than a minimum length F2 in the tire axial direction of the block body of the second block,
a ratio (E1/F1) of a protruding length E1 of the first block protruding portion to the minimum length F1 of the block body of the first block is larger than a ratio (E2/F2) of a protruding length E2 of the second block protruding portion to the minimum length F2 of the block body of the second block, and the protruding length E1 is greater than the protruding length E2.

2. The tire according to claim 1, wherein the protruding portion is disposed on one side in the tire circumferential direction of the block body.

3. The tire according to claim 1, wherein the protruding portion includes a corner portion of the block body on one side in the tire circumferential direction.

4. The tire according to claim 1, wherein in the development view of the tread portion, a length of the protruding portion along a longitudinal direction of the main groove decreases toward a protruding tip of the protruding portion.

5. The tire according to claim 4, wherein in the development view of the tread portion, the protruding portion has a trapezoidal shape in which the length gradually decreases toward the protruding tip.

6. The tire according to claim 5, wherein a maximum length (B) of the first part along the longitudinal direction of the main groove is in a range of from 45% to 55% of a maximum length (A) of the block body along the longitudinal direction of the main groove.

7. The tire according to claim 5, wherein a sum (B+C) of a maximum length (B) of the first part along the longitudinal direction of the main groove and a minimum length (C) of the first portion part along the longitudinal direction of the main groove is in a range of from 95% to 105% of a maximum length (A) of the block body along the longitudinal direction of the main groove.

8. The tire according to claim 5, wherein a minimum length (D) of the second part along the longitudinal direction of the main groove is in a range of from 25% to 35% of a maximum length (B) of the first part along the longitudinal direction of the main groove.

9. The tire according to claim 1, wherein a protruding length of the protruding portion in a protruding direction thereof is in a range of from 15% to 25% of a minimum length of the block main body in the tire axial direction.

10. The tire according to claim 1, wherein a radial height of the second part is in a range of from 45% to 55% of a radial height of the first part when each measured from a groove bottom of the main groove.

11. The tire according to claim 1, wherein the first block protruding portion is formed on one side in the tire circumferential direction of the block body of the first block and the second block protruding portion is formed on the other side in the tire circumferential direction of the block body of the second block.

12. The tire according to claim 1, wherein each lateral groove is provided with a tie bar formed by raising a groove bottom thereof and a ridge formed by raising the groove bottom thereof and extending axially outwardly from the tie bar.

13. The tire according to claim 12, wherein the ridge is a protruding body having a width smaller than that of the tie bar and a larger length in the tire axial direction than that of the tie bar.

14. The tire according to claim 12, wherein the ridge extends without being in contact with groove walls of the lateral groove.

15. The tire according to claim 13, wherein the ridge extends without being in contact with groove walls of the lateral groove.

16. The tire according to claim 1, wherein the ground contacting surface of the first block includes a pair of lateral block edges extending along the lateral grooves and a longitudinal block edge extending between the pair of the lateral block edges along the main groove, the longitudinal block edge includes a first edge portion, a second edge portion, a third edge portion, and a fourth edge portion, the first edge portion extends straight from an inner end in the tire axial direction of one of the lateral block edges toward an inner end in the tire axial direction of the other one of the lateral block edges, the second edge portion extends from the first edge portion axially inwardly and obliquely toward the inner end of the other one of the lateral block edges at a larger angle with respect to the tire circumferential direction than the first edge portion, the third edge portion extends from the second edge portion obliquely toward the inner end of the other one of the lateral block edges at a smaller angle with respect to the tire circumferential direction than the second edge portion, and the fourth edge portion extends from the third edge portion obliquely in an opposite direction to the second edge portion at a larger angle with respect to the tire circumferential direction than the third edge portion, wherein the protruding portion is defined as a portion protruding toward the main groove from an imaginary line that is obtained by extending the first edge portion smoothly in parallel with the third edge portion from a connecting position of the first edge portion and the second edge portion.

17. The tire according to claim 16, wherein the second part has a circumferential direction edge extending parallel with the imaginary line.

* * * * *